US010840488B2

(12) United States Patent
Izumi et al.

(10) Patent No.: US 10,840,488 B2
(45) Date of Patent: Nov. 17, 2020

(54) BATTERY FIXING DEVICE

(71) Applicant: VOLVO TRUCK CORPORATION, Gothenburg (SE)

(72) Inventors: Shigeaki Izumi, Saitama (JP); Tatsuya Fujino, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 297 days.

(21) Appl. No.: 16/060,971

(22) PCT Filed: Dec. 16, 2015

(86) PCT No.: PCT/JP2015/085294
§ 371 (c)(1),
(2) Date: Jun. 11, 2018

(87) PCT Pub. No.: WO2017/104034
PCT Pub. Date: Jun. 22, 2017

(65) Prior Publication Data
US 2018/0366703 A1    Dec. 20, 2018

(51) Int. Cl.
*H01M 2/10* (2006.01)
*B60R 16/04* (2006.01)

(52) U.S. Cl.
CPC ........... *H01M 2/1083* (2013.01); *B60R 16/04* (2013.01); *H01M 2/10* (2013.01); *B60Y 2200/14* (2013.01);
(Continued)

(58) Field of Classification Search
CPC ... B60R 16/04; H01M 2/1083; H01M 2/1077; H01M 2/1072
See application file for complete search history.

(56) References Cited

U.S. PATENT DOCUMENTS 2,009,199 A * 7/1935 Pehotsky ................ B60R 16/04
180/68.5
2,022,595 A * 11/1935 Gowing .............. H01M 2/1072
429/65
(Continued)

FOREIGN PATENT DOCUMENTS

JP   H4324007 Y1   10/1968
JP   S5114733 U    2/1976
(Continued)

OTHER PUBLICATIONS

Extended European Search Report for European Patent Application No. 15910724.2, dated Jul. 11, 2019, 8 pages.
(Continued)

*Primary Examiner* — Emma K Frick
(74) *Attorney, Agent, or Firm* — Withrow & Terranova, PLLC

(57) ABSTRACT

A battery fixing device includes: a receiving member on which two batteries are placed parallel to each other; a retainer having a portion hanging down between the two batteries to retain mutually opposed shoulder portions of the two batteries: rods having a proximal end and a distal end, the proximal end being fixed to the receiving member and the distal end passing through each end of the retainer; and nuts threadably engaged with the distal ends of the rods. The rods penetrate through the retainer within the range in which the two batteries are opposed.

9 Claims, 9 Drawing Sheets

(52) U.S. Cl.
CPC ........ *H01M 2/1072* (2013.01); *H01M 2/1077* (2013.01)

(56) References Cited

U.S. PATENT DOCUMENTS

| | | | | |
|---|---|---|---|---|
| 2,104,768 A * | 1/1938 | Saunders | ................ | B60R 16/04 180/68.5 |
| 2,326,481 A * | 8/1943 | Meyer | ................ | H01M 2/1083 180/68.5 |
| 2,480,202 A * | 8/1949 | Stassen | ................ | B60R 16/04 180/68.5 |
| 2,514,056 A * | 7/1950 | Hatfield | ................ | H01M 2/1083 180/68.5 |
| 2,802,540 A * | 8/1957 | Brookbank | ................ | B60R 16/04 180/68.5 |
| 2,833,363 A * | 5/1958 | Henehan | ................ | H01M 2/1083 180/68.5 |
| 2,849,074 A * | 8/1958 | Key | ................ | H01M 2/1083 180/68.5 |
| RE25,480 E * | 11/1963 | Merkle | ................ | H01M 2/1083 180/68.5 |
| 3,557,895 A * | 1/1971 | Thomas | ................ | H01M 2/1083 180/68.5 |
| 3,866,704 A * | 2/1975 | Bowers | ................ | H01M 2/1083 180/68.5 |
| 3,894,607 A * | 7/1975 | Brock | ................ | B60R 16/04 180/68.5 |
| 3,991,844 A * | 11/1976 | Reynier | ................ | B60R 16/04 180/68.5 |
| 4,129,194 A * | 12/1978 | Hammond | ................ | B60R 16/04 105/51 |
| 4,317,497 A * | 3/1982 | Alt | ................ | B60K 1/04 180/68.5 |
| 4,808,495 A * | 2/1989 | Goldstein | ................ | H01M 2/043 429/175 |
| 5,004,081 A * | 4/1991 | Custer | ................ | B60R 16/04 180/68.5 |
| D321,856 S * | 11/1991 | Whitley, II | ................ | 180/68.5 |
| 5,228,532 A * | 7/1993 | Browning | ................ | B60R 16/04 180/68.5 |
| 5,547,160 A * | 8/1996 | Johnson | ................ | B60R 16/04 180/68.5 |
| 6,102,356 A * | 8/2000 | Huntley | ................ | H01M 2/1083 248/500 |
| 6,189,635 B1 * | 2/2001 | Schuler | ................ | B60R 16/04 180/65.1 |
| 6,439,329 B1 * | 8/2002 | Vaishnav | ................ | B60R 16/04 180/68.5 |
| 6,639,800 B1 * | 10/2003 | Eyman | ................ | H01L 23/4006 165/185 |
| 6,648,090 B2 * | 11/2003 | Iwase | ................ | B60K 1/04 180/68.5 |
| 6,871,829 B2 * | 3/2005 | Shannon, Jr. | ................ | A47G 11/002 180/68.5 |
| 7,014,002 B2 * | 3/2006 | Mizuta | ................ | B60R 16/04 180/68.5 |
| 7,543,666 B2 * | 6/2009 | Connelly | ................ | B60R 16/04 180/68.5 |
| D611,413 S * | 3/2010 | Brockington | ................ | D13/119 |
| 2015/0280187 A1 * | 10/2015 | Yaklin | ................ | H01M 2/1083 429/100 |

FOREIGN PATENT DOCUMENTS

| | | |
|---|---|---|
| JP | S52090828 U | 7/1977 |
| JP | S60136263 A | 7/1985 |
| JP | H02124661 U | 10/1990 |
| JP | H0516508 U | 3/1993 |
| JP | H11314583 A | 11/1999 |
| JP | 2000315484 A | 11/2000 |
| JP | 3144295 B2 | 3/2001 |
| JP | 2001329567 A | 11/2001 |
| JP | 2003312394 A | 11/2003 |
| JP | 2005297861 A | 10/2005 |
| JP | 2011126396 A | 6/2011 |
| JP | 2012084239 A | 4/2012 |
| WO | 9120099 A1 | 12/1991 |
| WO | 2011136107 A1 | 11/2011 |
| WO | WO2015022255 * | 2/2015 |

OTHER PUBLICATIONS

Reasons for Rejection for Japanese Patent Application No. 2017-555936, dated Oct. 29, 2019, 8 pages.
International Search Repots (dated Mar. 1, 2016) for corresponding International App. PCT/JP2015/085294.

* cited by examiner

BATTERY FIXING DEVICE

BACKGROUND AND SUMMARY

The present invention relates to a fixing device for two batteries in parallel to each other.

As disclosed in JP 2003-312394 A (Patent Document 1), a battery fixing device which fixes two batteries disposed parallel to each other is, for example, used in a vehicle such as a heavy truck so as to drive a starter motor that consumes large amounts of power. This battery fixing device includes a receiving member on which two batteries disposed parallel to each other are placed, three retainers (holding members) to retain the outer side shoulder portions and the portions opposed to each other of the parallel-disposed batteries, and six rods which urge these retainers toward the receiving member.

REFERENCE DOCUMENT LIST

Patent Document 1: JP 2003-312394 A

Since the abovementioned battery fixing device is configured to urge the batteries against the receiving member with the six rods, when attaching and detaching the batteries, it is necessary to fasten and loosen nuts which are threadably engaged with the six rods, and thus, the operation for attaching and detaching the batteries requires much effort. Especially when the gap between the upper face of the retainers and the vehicle body is narrow, a space for the operation to fasten or loosen the nuts is narrow, and thus, such an operation requires great effort.

It is desirable to provide a battery fixing device for which the operation of attaching and detaching batteries is improved.

A battery fixing device includes: a receiving member on which two batteries are placed so that the batteries are apart from and disposed parallel to each other, one retainer having a portion hanging down between the two batteries to retain mutually opposed shoulder portions of the two batteries: two rods, in each of which a proximal end is fixed to the receiving member in the extending direction of the retainer, and in each of which a distal end passes through each end of the retainer; and two nuts threadably engaged with the distal ends of the rods passed through the retainer. The rods penetrate through the retainer within the range in which the two batteries are opposed.

A battery fixing device includes: a receiving member on which a plurality of batteries are placed parallel to each other; two retainers, each configured to retain an outer side shoulder portion of one of the plurality of batteries; and two rotating plates that are rotatably fixed on a plane perpendicular to the direction in which the plurality of batteries is disposed to rotate about an axis parallel to a plane on which the plurality of batteries is placed. The battery fixing device further includes; four rods each having a proximal end and a distal end, the proximal ends being fixed to relatively rotate at positions on opposite sides of a center of the rotation of each rotary plate, and the distal ends penetrating through both ends of the retainers; and four nuts each threadably engaged with the distal end of the rod passed through the retainer.

According to an aspect of the present invention, it is possible to improve the operation of attaching and detaching batteries.

DETAILED DESCRIPTION

Figure 1:
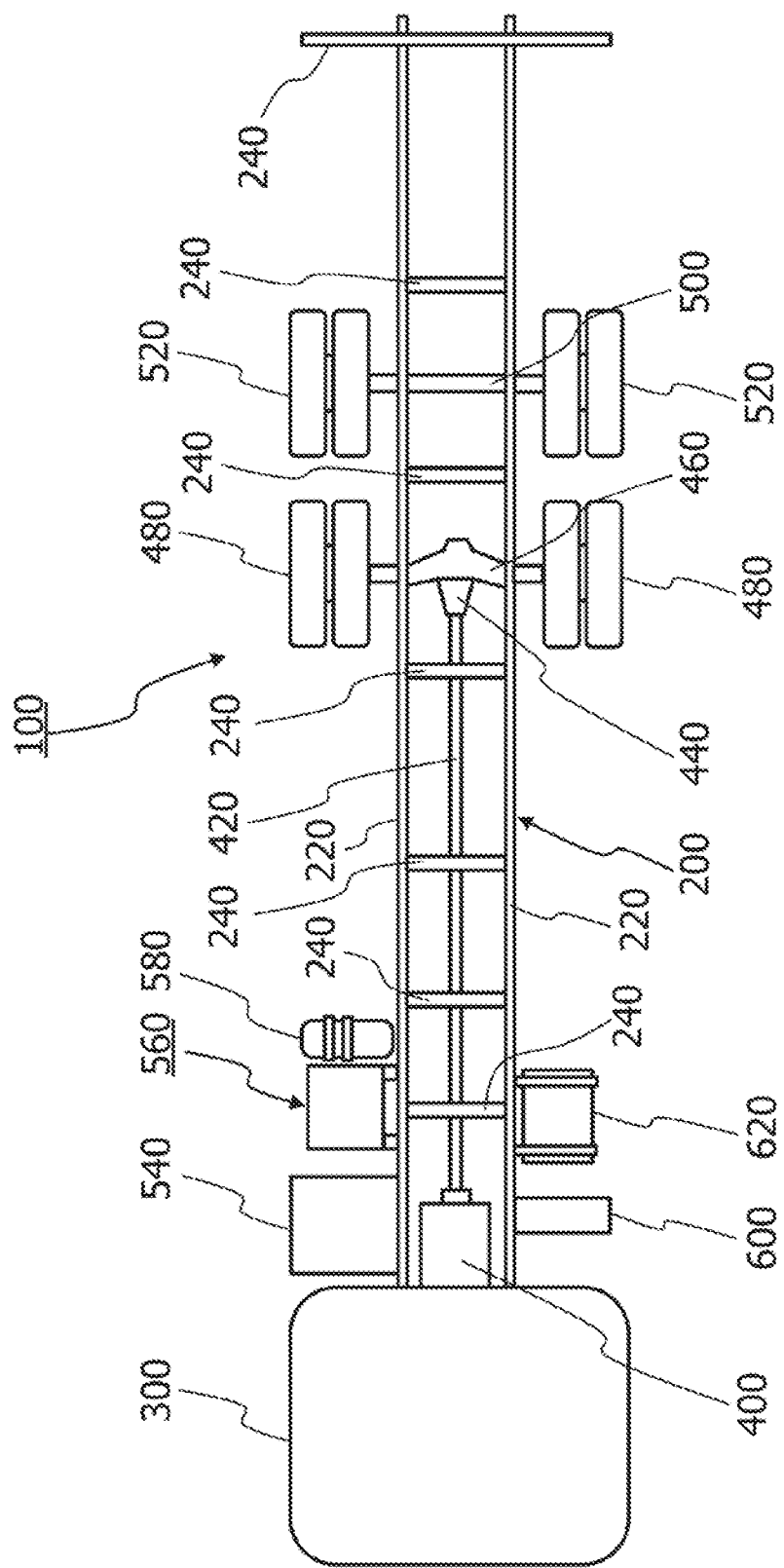
FIG. 1 is a plan view illustrating one example of the layout of a truck.

Hereinafter, an embodiment for implementing the present invention is explained with reference to the accompanying drawings. FIG. 1 illustrates one example of the layout of a truck. The following describes the truck as one example of the vehicle.

The truck 100 includes a parallel-ladder shaped frame 200 and a cabin 300 placed in front of the frame 200. The frame 200 has a pair of left and right side frames 220 extending parallel to the vehicle front-rear direction, and a plurality of cross members 240 extending in the vehicle width direction to couple the pair of left and right side frames 220. Here, being "parallel" is not limited to being perfectly parallel, and it may be what is visually recognizable as being parallel (the same will apply hereinafter). The frame 200 functions as the base framework of the truck 100, to which an engine, a power transmission device, a suspension and the like are attached.

An engine (not illustrated) is mounted below the cabin 300. The output from the engine is transmitted to left and right rear wheels 480 as the driven wheels via a transmission 400, a propeller shaft 420, a differential carrier 440, and a drive axle 460. A dead axle 500 is disposed at the rear side of the left and right wheels 480, and the dead axle 500 rotatably supports left and right rear wheels 520 as driving wheels at both ends of the dead axle 500.

On an outer side surface of the side frame 220 at the right side of the vehicle, between the cabin 300 and the rear wheel 480, an exhaust emission purifying apparatus 540, a battery fixing device 560 and an air reservoir tank 580 are attached in this order from the front side to the rear side of the vehicle. On an outer side surface of the side frame 220 on the left side of the vehicle, between the cabin 300 and the rear wheel 480, a reducing-agent tank 600 which stores the reducing agent used at the exhaust emission purifying apparatus 540 and a fuel tank 620 are attached in this order from the front side to the rear side of the vehicle. The battery fixing device 560 is not limited to being attached at the position as in the drawing, and may be attached at other positions, such as in front of the exhaust emission purifying apparatus 540 or the outer side surface of the side frame 220 on the left side of the vehicle.

First Embodiment

Figure 2:
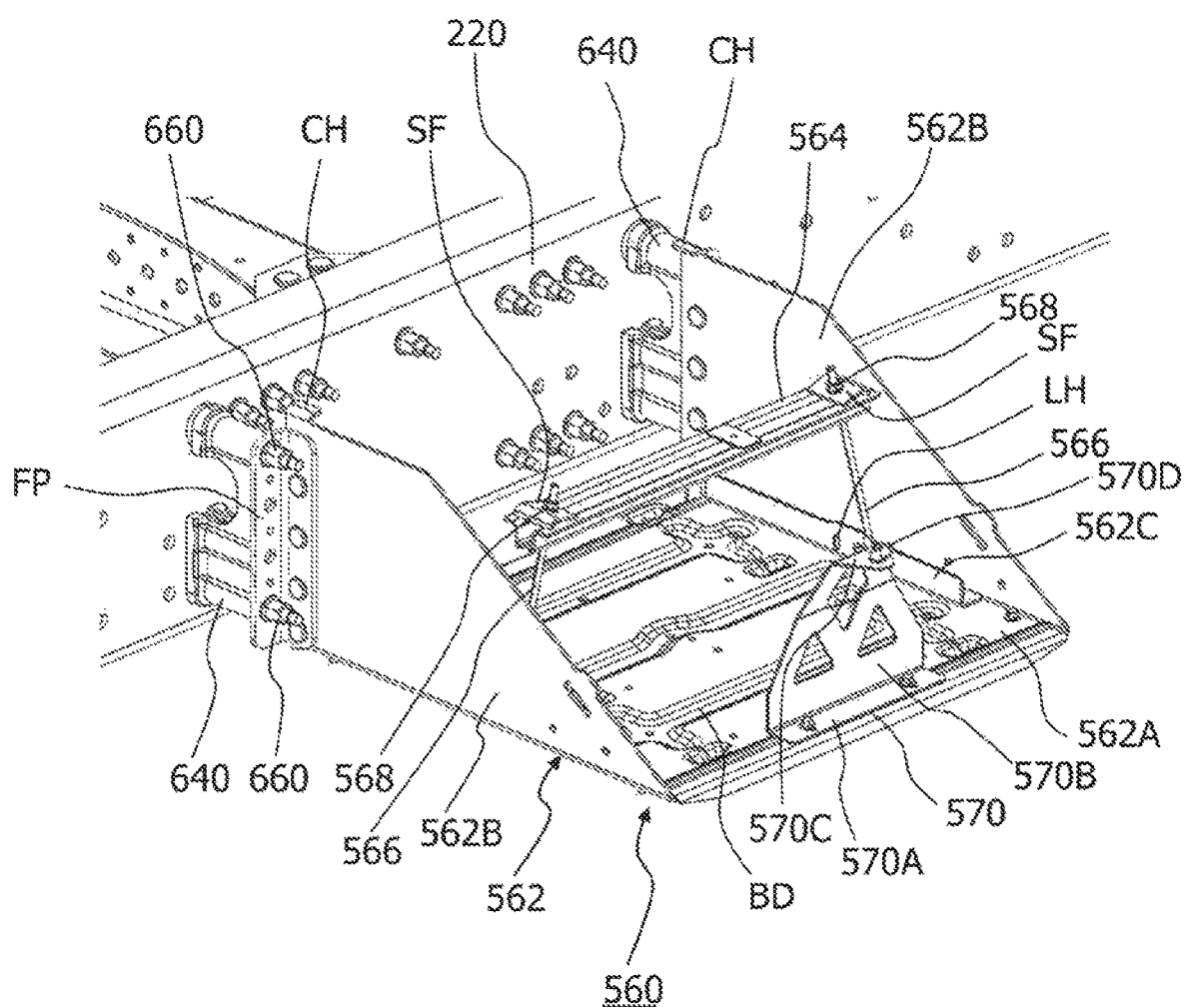
FIG. 2 is a perspective view of the battery fixing device according to the first embodiment.
Figure 3:
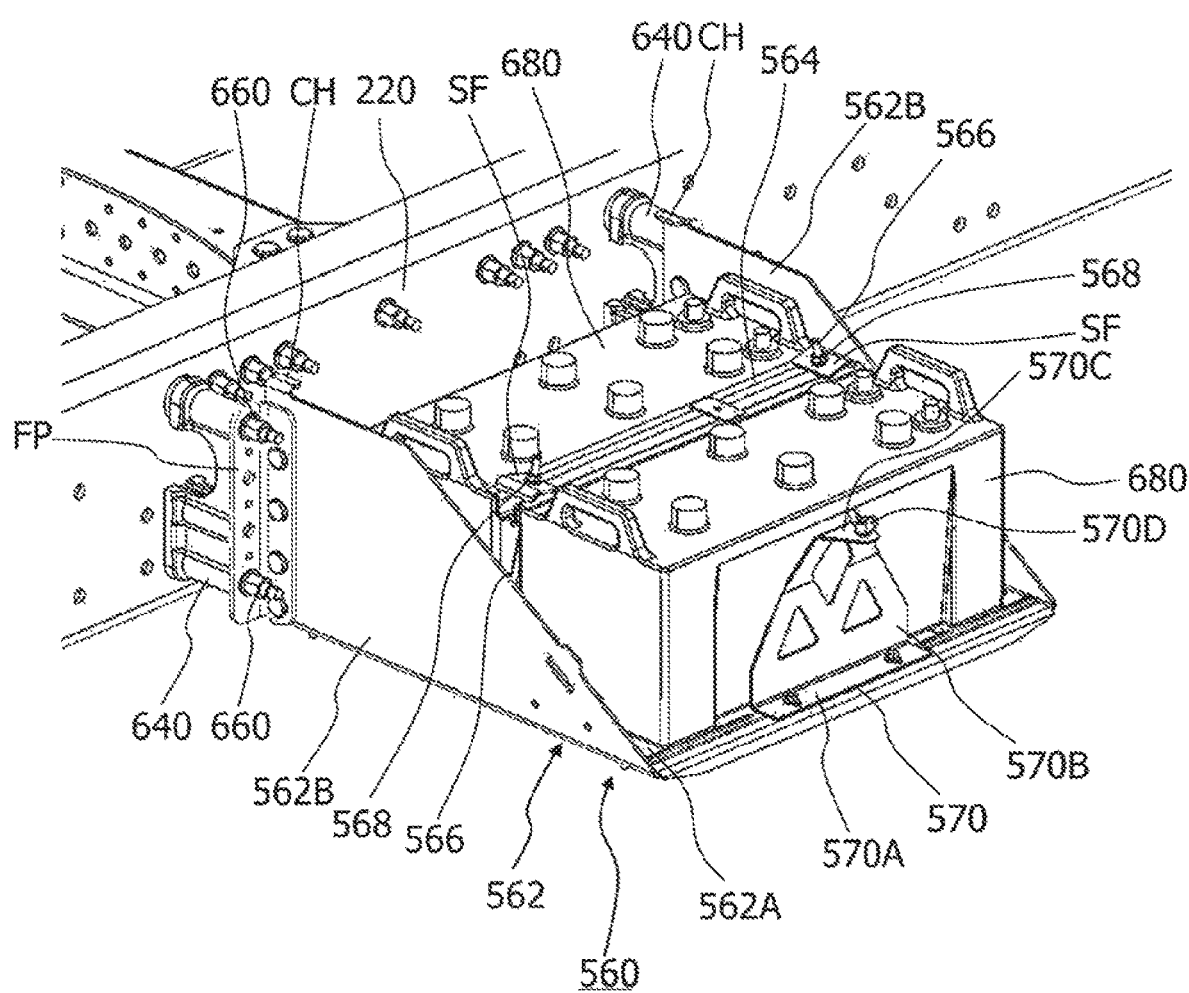
FIG. 3 is a perspective view of the battery fixing device on which batteries are mounted according to the first embodiment.
Figure 4:
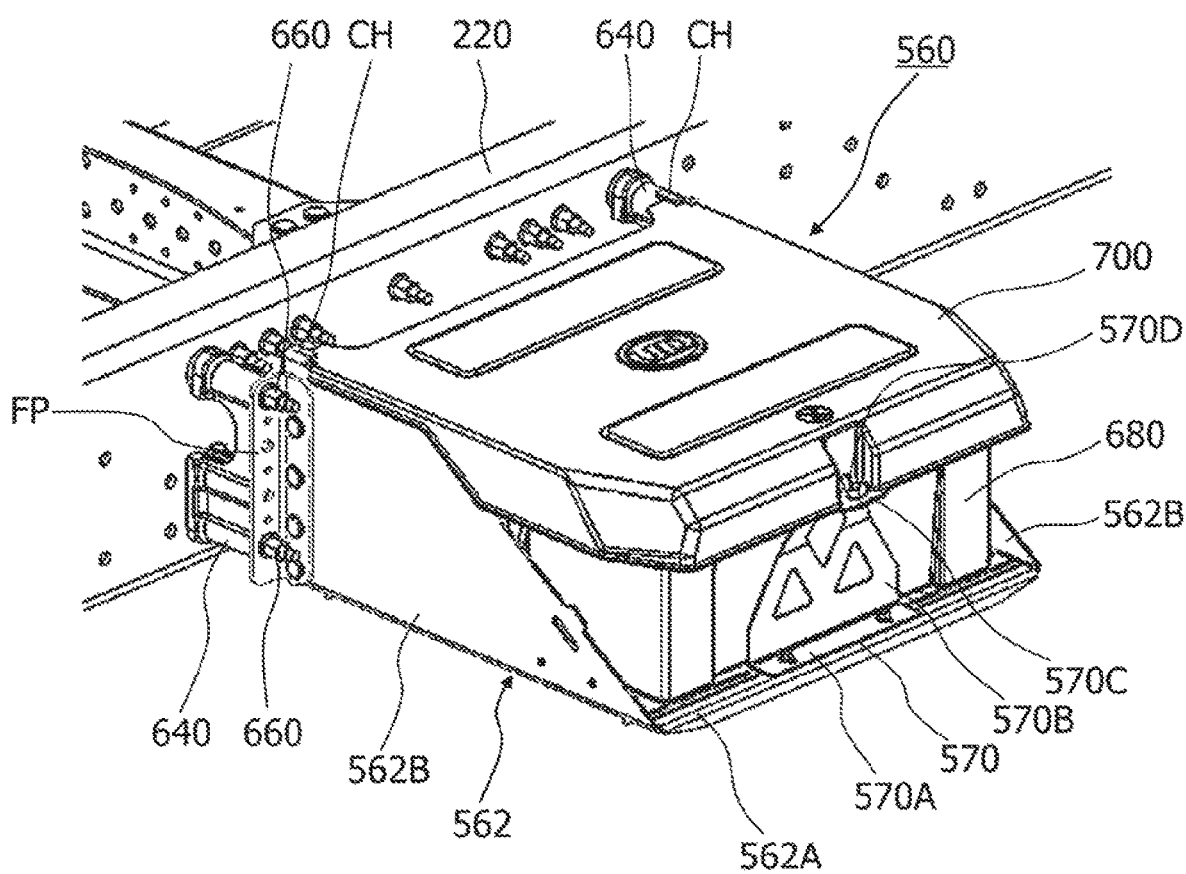
FIG. 4 is a perspective view of the battery fixing device to which a battery cover is attached according to the first embodiment.

FIGS. 2 to 4 illustrate the battery fixing device 560 according to the first embodiment. The battery fixing device 560 is attached to the outer side surface of the side frame 220 via a bracket 640 having bosses at two vertically apart positions, with fasteners 660 such as a bolt, a washer, and a nut.

The battery fixing device 560 includes a receiving member 562 on which two batteries 680 are placed so that the batteries are apart from and disposed parallel to each other, and one retainer 564 having a portion hanging down between the two batteries 680 to retain mutually opposed shoulder portions of the two batteries 680. The battery fixing device 560 further includes: two rods 566, in each of which a proximal end is fixed to the receiving member 562 in the extending direction of the retainer 564, and in each of which a distal end passes through each end of the retainer 564; and two nuts 568 each threadably engaged with the distal end of the rod 566 passed through the retainer 564. The rods 566 penetrate through the retainer 564 within the range in which the two batteries 680 are opposed. In the drawings, the battery fixing device 560 fixes the two batteries 680 that are disposed in parallel in the width direction of the vehicle, and the two batteries 680 may be disposed in parallel in the vehicle front-rear direction (the same will apply hereinafter).

The receiving member 562 has a rectangular parallelepiped shape of which the outer side in the vehicle width direction is open and of which the upper side is open. The receiving member 562 includes a bottom plate 562A, a pair of side plates 562B and a pair of battery holders 562C, which are made of thin steel plate, for example. Here, a rectangular parallelepiped shape is not limited to a perfect rectangular solid, and may be one visually recognizable as a rectangular solid (the same will apply hereinafter).

The bottom plate 562A is a rectangular plate located in a horizontal plane defined in the vehicle width direction and the vehicle front-rear direction. On the upper face of the bottom plate 562A, the two batteries 680 are placed parallel to each other. Here, a rectangular shape is not limited to a perfect rectangle, and it may be one visually recognizable as a rectangle (the same will apply hereinafter). In order to improve the strength of the bottom plate 562A, the bottom plate 562A has a plurality of beads (concave and convex portions) BD that extend in at least one of the vehicle front-rear direction and the vehicle width direction. The bottom plate 562A may have ribs that stand upward from both ends on the inner side and the outer side in the vehicle width direction.

Each side plate 562B stands upward from both ends of the bottom plate 562A in the vehicle front-rear direction and has a trapezoidal shape having a corner at right angles (right angle trapezoid) and having a diagonally cut shoulder portion on the outer side in the vehicle width direction. At the end of the side plate 562B on the inner side in the vehicle width direction, a fixing plate FP is integrated with the side plate 562B. This fixing plate FP is a long member for fixing to the bracket 640 and has an L-shaped cross section (like an angle member). Here, an L shape is not limited to a perfect L shape, and it may be one visually recognizable as an L shape (the same will apply hereinafter). The fixing plate FP has a plurality of holes for insertion of bolts at positions which correspond to the bosses of the bracket 640. At a shoulder portion of the side plate 562B on the inner side in the vehicle width direction, a cover holder CH is integrated with the side plate 562B. The cover holder CH is a rectangular plate extending horizontally to retain the upper face of a battery cover 700 at a position located on the inner side in the vehicle width direction.

The battery holder 562C is a long member having an L-shaped cross section. The battery holders 562C are fixed at both ends of the bottom plate 562A in the vehicle front-rear direction while maintaining the axis of the member of the battery holder 562C along the vehicle width direction. Two battery holders 562C are disposed apart from each other by the distance corresponding to the width of the batteries 680 so as to hold both side faces of the batteries 680 between the parts of the battery holders 562C standing upward from the bottom plate 562A. The ends of the pair of the battery holders 562C on the inner side in the vehicle width direction are bent at right angles so as to be closer to each other. Here, right angles are not limited to perfect right angles and may be ones visually recognizable as right angles (the same will apply hereinafter). With this configuration, the pair of battery holders 562C can limit the movement of the two batteries 680 placed on the bottom plate 562A in the vehicle front-rear direction as well as in the inward movement in the vehicle width direction. At a middle portion of the battery holder 562C, at least one long hole LH is formed. This long hole extends vertically to detachably and swingably fix the proximal end of the rod 566.

The retainer 564 is a long member having a hat-shaped cross section that protrudes downward, and has an overall length that corresponds to the width of the batteries 680. Here, a hat shape is not limited to a perfect hat shape, and it may be one visually recognizable as a hat shape. At the protrusions located on both ends of the retainer 564, through holes through which the axis of the rods 566 is passed are formed. Accordingly, when the pair of rods 566 pass through these through holes of the retainer 564, the rods are inclined while approaching each other in an inverted V shape as illustrated in FIG. 2. The upper face of the retainer 564 has a slanted face SF that is slanted according to the inclination angle of the rod 566, that is, perpendicular to the axis line of the rod 566. This slanted face SF has a through hole through which the axis of the rods 566 passes. The slanted face SF may be formed by welding a member made of steel that bends in an L shape to the retainer 564, for example.

For example, the rod 566 is a J bolt having a J-shaped proximal end in a J shape, and the J-shaped proximal end is detachably fitted into the long hole LH of the battery holder 562C. The rod 566 therefore is swingable at a predetermined angle at least in the vehicle front-rear direction. The distal end of the rod 566 passes through the through holes of the retainer 564 and of the slanted face SF, and protrudes upward from the upper face of the slanted face SF.

After passing through the retainer 564, a nut 568 is threadably engaged with the distal end of the rod 566 to be detachable, so as to change the position of the retainer 564 relative to the bottom plate 562A integrated with the battery holders 562C. In addition to the nut 568 to be threadably engaged, a washer may fit to the distal end of the rod 566 to suppress loosening.

To the end portion of the bottom plate 562A positioned at the outer side in the vehicle width direction, a battery cover bracket 570 is attached. This battery cover bracket 570 limits the outward movement of the batteries 680 in the vehicle width direction and detachably fixes the battery cover 700 that covers the upper portion of the battery 680. The battery cover bracket 570 has a rectangular first member 570A which is a fixing portion to fix the battery cover bracket 570 to the bottom plate 562A, an isosceles trapezoidal second member 570B standing upward from one end of the first member 570A, and a triangular third member 570C outwardly extending in the vehicle width direction from the upper end of the second member 570B. Here, an isosceles trapezoidal shape and a triangular shape are not limited to perfect isosceles trapezoidal shape and triangular shapes, and they may be ones visually recognizable as an isosceles trapezoidal shape and a triangular shape (the same will apply hereinafter). On the upper face of the third member 570C, a butterfly nut 570D is threadably engaged to be detachable. This butterfly nut 570D fixes the battery cover 700 to the receiving member 562 via a fixing hole formed at an outer side portion of the battery cover 700 in the vehicle width direction.

Next, an example of the method of using the battery fixing device 560 according to the first embodiment is described. To attach the batteries 680, an operator places one of the batteries 680 on the upper face of the receiving member 562, and moves this battery 680 toward the inside in the vehicle width direction. When the operator moves the battery 680 to a predetermined position, the lower portion of the battery 680 in the vehicle front-rear direction and on the inner side in the vehicle width direction comes in contact with the battery holders 562C, so that the battery holder 562C limits the movement of the battery 680 in the vehicle front-rear direction and toward the inside in the vehicle width direction.

The operator fits the proximal end of each rod 566 to the long hole LH of the battery holder 562C, and then places the other battery 680 on the upper face of the receiving member 562. Then the operator passes the distal end of each rod 566 through the through hole of each end of the retainer 564 and the through hole of the slanted face SF, and threadably engages the nut 568 loosely with the distal end. The operator puts the protrusion of the retainer 564 in between the two batteries 680, and tightens each nut 568 that is threadably engaged with the distal end of the rod 566.

In this state, the outer surface of the battery 680 on the outer side in the vehicle width direction comes in contact with the battery cover bracket 570. Thus, it is possible to limit the movement of the batteries 680 to the outside in the vehicle width direction. The points of application at which the rods 566 work on the retainer 564 are within the area in which the two batteries 680 are opposed, and thus, even if the tensile force of the rod 566 increases, it is difficult to deform the retainer 564 to bow. Accordingly, the strength to fix the batteries 680 can be improved. Additionally, the upper face of the retainer 564 includes the slanted face SF according to the inclination angle of the rods 566. Thus, the tensile force of the rod 566 can be transmitted effectively to the retainer 564, to thereby fix the batteries 680 securely. The batteries 680 can be fixed to the receiving member 562 with one retainer 564 and a pair of rods 566. Thus, compared to conventional battery fixing devices, the number of nuts involved in the operation can be reduced, and the operations of attaching and detaching the batteries 680 are easily performed.

After that, as illustrated in FIG. 4, the operator places a portion of the battery cover 700 to be located on the inner side in the vehicle width direction in between the upper face of the battery 680 and the cover holder CH of the side plate 562B, and fixes a portion of the battery cover on the outer side in the vehicle width direction with the butterfly nut 570D of the battery cover bracket 570.

When the batteries 680 are detached from the battery fixing device 560, the operator may perform the above operation in reverse order. The above operation may be modified to some extent. For instance, the order of the steps may be changed, or before the batteries 680 are attached or detached, the operator may detach the battery cover bracket 570.

Second Embodiment

Figure 5:
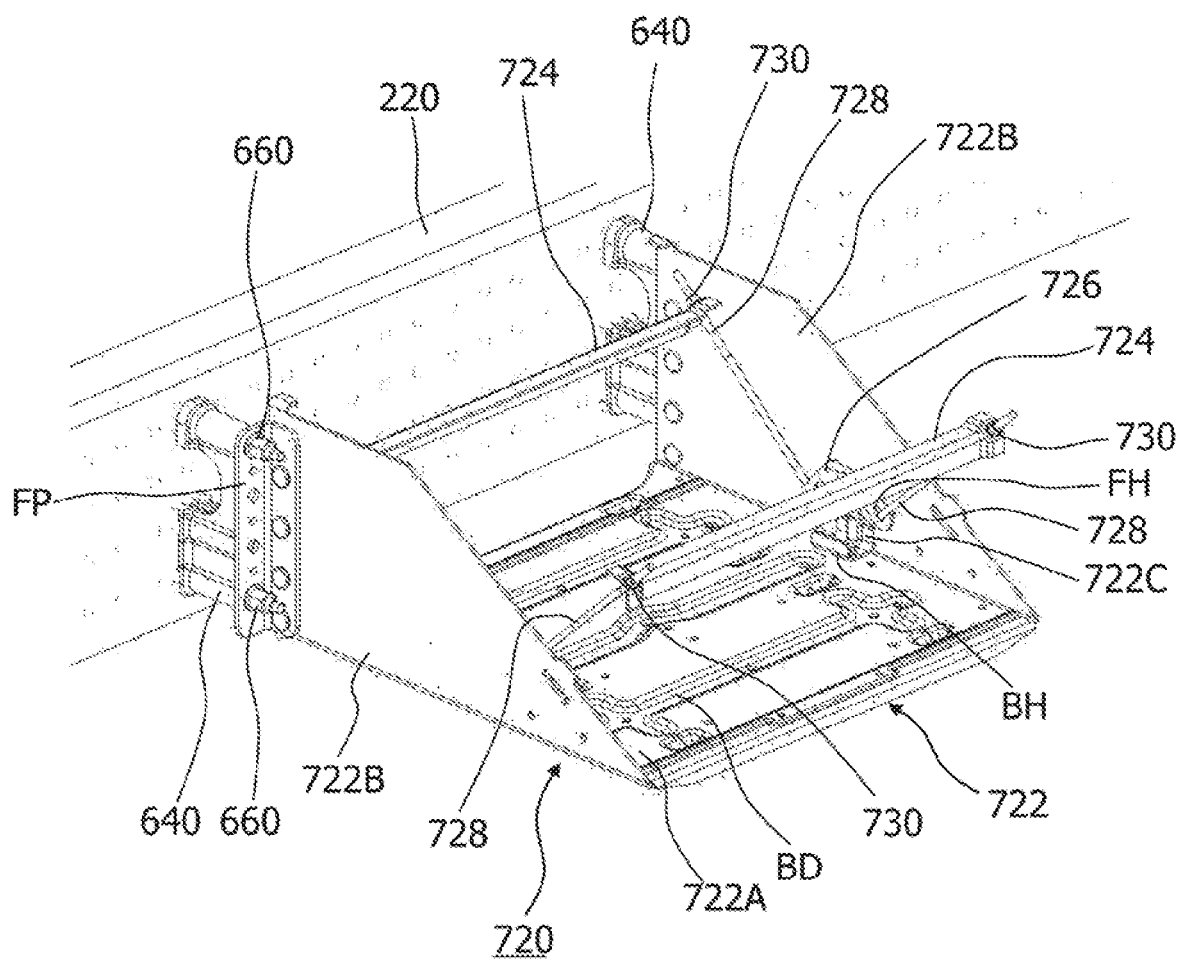
FIG. 5 is a perspective view of the battery fixing device according to the second embodiment.
Figure 6:
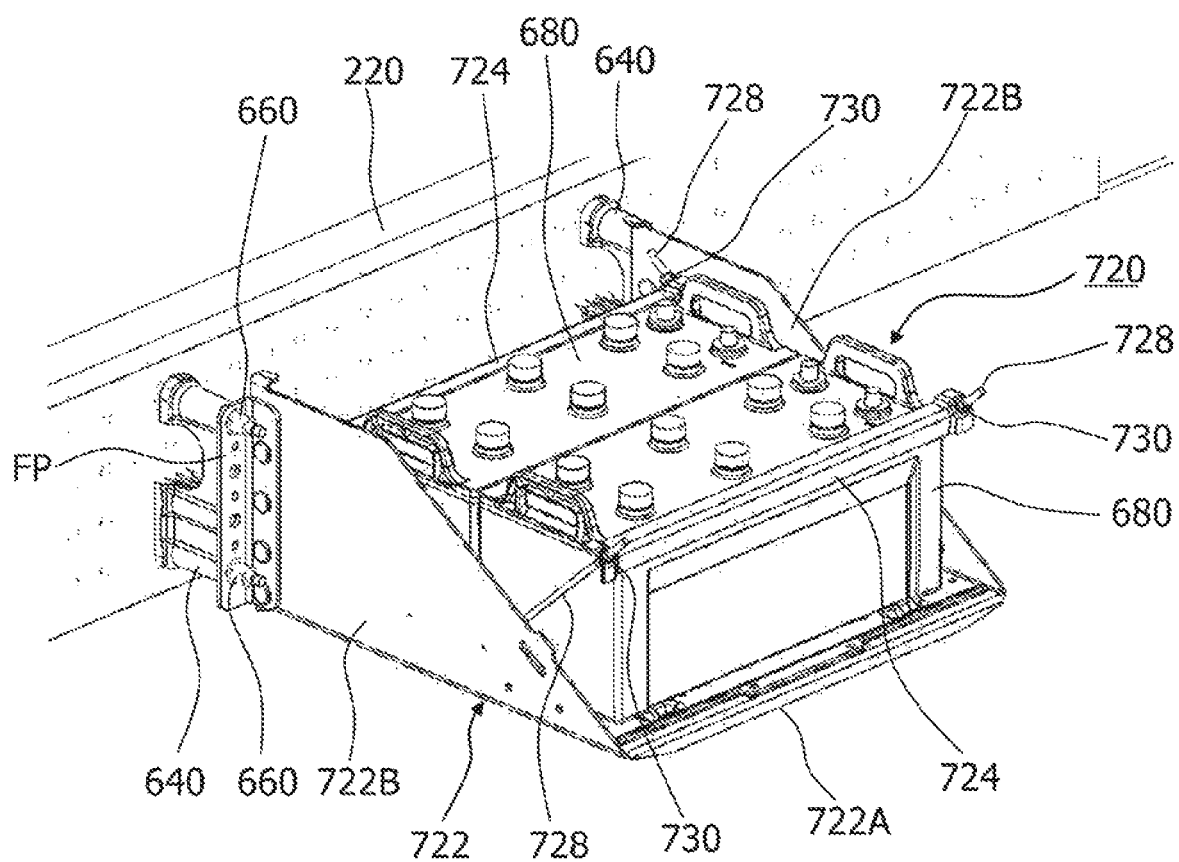
FIG. 6 is a perspective view of the battery fixing device on which batteries are mounted according to the second embodiment.

FIGS. 5 and 6 illustrate a second embodiment of the battery fixing device 560. To avoid confusion with the battery fixing device 560 of the first embodiment, the following description assigns reference numeral 720 to the battery fixing device of the second embodiment.

The battery fixing device 720 includes a receiving member 722 on which two batteries 680 are placed parallel to each other, and two retainers 724 each configured to respectively retain the outer side shoulder portions of the two batteries 680. The battery fixing device 720 further includes: two V-shaped levers 726 that are fixed rotatably about the axis perpendicular to the direction in which the two batteries 680 are disposed (i.e., the vehicle width direction) on the boundary face between the two batteries 680; four rods 728 each having the proximal end and the distal end, the proximal ends being fixed to relatively rotate at positions on the opposite sides of the center of the rotation of the V-shaped levers 726, and the distal ends penetrating through the both ends of the retainers 724; and four nuts 730 each threadably engaged with the distal end of the rod 728 passed through the retainer 724. The V-shaped levers 726 are one example of a rotating plate.

The receiving member 722 has a rectangular parallelepiped shape of which the outer side in the vehicle width direction is open and of which the upper side is open. The receiving member 722 includes a bottom plate 722A and a pair of side plates 722B, which are made of thin steel plate, for example.

The bottom plate 722A has a rectangular plate located in a horizontal plane defined in the vehicle width direction and the vehicle front-rear direction. On the upper face of the bottom plate 722A, the two batteries 680 are placed parallel to each other. In order to improve the strength of the bottom plate 722A, the bottom plate 722A has a plurality of beads BD that extends in at least one of the vehicle front-rear direction and the vehicle width direction. The bottom plate 722A may have ribs that stand upward from both ends on the inner side and the outer side in the vehicle width direction.

Each side plate 722B stands upward from both ends of the bottom plate 722A in the vehicle front-rear direction and has a trapezoidal shape having a corner at right angles and having a diagonally-cut shoulder portion on the outer side in the vehicle width direction. At the end of the side plate 722B on the inner side of the vehicle width, a fixing plate FP is integrated with the side plate 722B. This fixing plate FP is a long member for fixing to the bracket 640 and has an L-shaped cross section. The fixing plate FP has a plurality of holes for insertion of bolts at positions which correspond to the bosses of the bracket 640.

Each retainer 724 is a long member having an L-shaped cross section and has an overall length slightly longer than the width of the batteries 680. Each retainer 724 has through holes at both ends that protrude from the battery 680 when the retainer 724 retains the outer side shoulder portion of the battery 680, and the axis of the rods 728 pass through these through holes. The upper face of each retainer 724 at least at both ends may have slanted faces SF according to the inclination angle of the rods 728.

Figure 7:
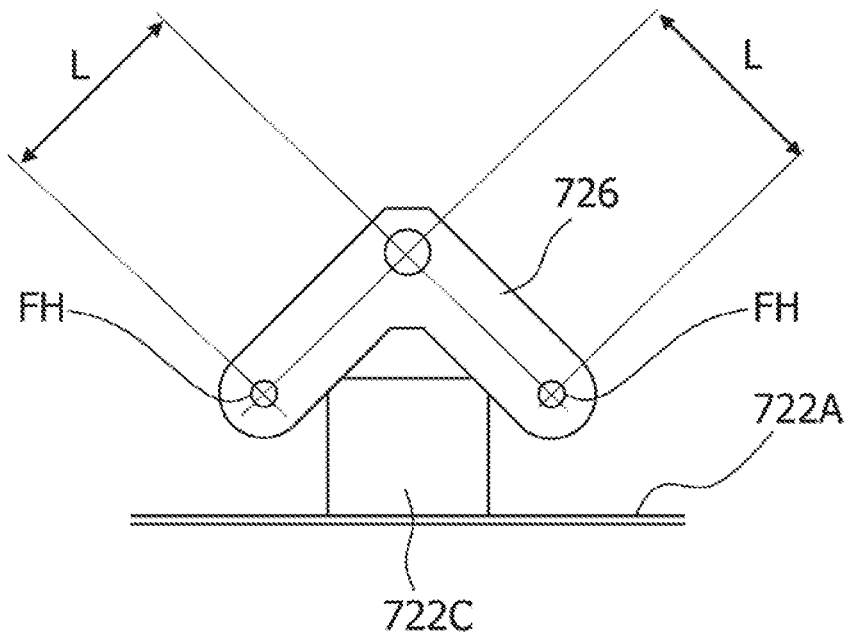
FIG. 7 is a detailed view of a V-shaped lever in the second embodiment.

As illustrated in FIG. 7, each V-shaped lever 726 is a V-shaped thin-plate member having arms extending at right angles (90 degrees). Each arm has a fixing hole FH at the distal end portion which detachably fixes the proximal end of the rod 728 to be swingable. These fixing holes FH are formed at positions (distance L) equally apart from the center portion of the V-shaped lever 726, that is, from the center of the rotation of the V-shaped lever 726 at which the axis lines of the arms intersect. Accordingly, the proximal ends of the rods 728 are fixed at the positions equally apart from the center of the rotation of the V-shaped lever 726. The V-shaped lever 726 is symmetrical with respect to the line that divides the angle between the axis lines of the arms into halves. Instead of the fixing holes FH, the arms of the V-shaped lever 726 may have long holes at their distal ends that extend in the direction orthogonal to the extending direction of the arms.

The center of the rotation of the V-shaped lever 726 is fixed rotatably to the distal end of a lever bracket 722C having an L-shaped cross section so that the V-shaped lever 726 has an inverted V-shape, that is, to be projected upward. The proximal end of the lever bracket 722C, that is, the lower face of the lever bracket 722C which corresponds to the shorter side of the L-shape, is fixed to the upper face of the bottom plate 722A so that the side face of the lever bracket 722C which corresponds to the longer side extends in the vehicle width direction. The lever bracket 722C is placed so that the rotation axis of the V-shaped lever 726 is located on the boundary face of the two batteries 680 and so that the plate face of the V-shaped lever 726 is coplanar with the through holes of the retainers 724 which retains the outer side shoulder portions of the two batteries 680. The lever bracket 722C is integrally formed with a rectangular battery holder BH at the leading edge of the proximal end, that is, at the position which corresponds to the width of the batteries 680. This battery holder BH standing upward from the position limits the movement of the batteries 680 in the vehicle front-rear direction.

For example, each rod 728 is a J bolt having a J-shaped proximal end, and the J-shaped proximal end is detachably fitted into the fixing hole FH of the V-shaped lever 726. Thus, the rod 728 is swingable at least in the vehicle width direction. The distal end of the rod 728 passes through the through hole of the retainer 724 and protrudes upward from the upper face of the retainer 724.

After passing through the retainer 724, a nut 730 is threadably engaged with the distal end of the rod 728 so as to be detachable, so as to allow change of the position of the retainer 724 relative to the fixing hole FH of the V-shaped lever 726. In addition to the nut 730 to be threadably engaged, a washer may fit to the distal end of the rod 728 to suppress loosening.

When the two batteries 680 are fixed on the receiving member 722, the dimensions of various portions of the V-shaped lever 726 and the attachment position of the lever bracket 722C, for example, are set appropriately so that the axis line of each rod 728 extends at an angle of 90 degrees (right angle) relative to the axis line of the corresponding arm of the V-shaped lever 726. In this configuration, the tensile force of the rods 728 is effectively transmitted to the V-shaped lever 726.

Next, an example of the method of using the battery fixing device 720 according to the second embodiment is described. Prior to the operation to attach and detach the batteries 680, as illustrated in FIG. 5, the proximal end of each rod 728 is fitted into the fixing hole FH of the V-shaped lever 726, and the distal end of the rod 728 is passed through the through hole of the retainer 724, and the nut 730 is threadably engaged with the distal end of the rod 728. For the retainer 724 located inside in the vehicle width direction, the position of the nut 730 threadably engaged with the distal end of each rod 728 passing through the retainer 724 may be adjusted according to the dimensions of the batteries 680.

To attach the batteries 680, the operator places one of the batteries 680 on the receiving member 722, and moves this battery toward the inside in the vehicle width direction while the retainer 724 retains the outer side shoulder portion of the battery 680. Then, while the operator holds the retainer 724 upward, which is to retain the outer side shoulder portion of the other battery 680 to be placed on the outer side in the vehicle width direction, and places the other battery 680 on the receiving member 722. Then, the operator moves this battery 680 until it comes in contact with the battery 680 placed inside in the vehicle width direction. Then, the operator lowers the retainer 724 held upward to retain the outer side shoulder portion of the battery 680 placed on the outer side in the vehicle width direction.

Figure 8:
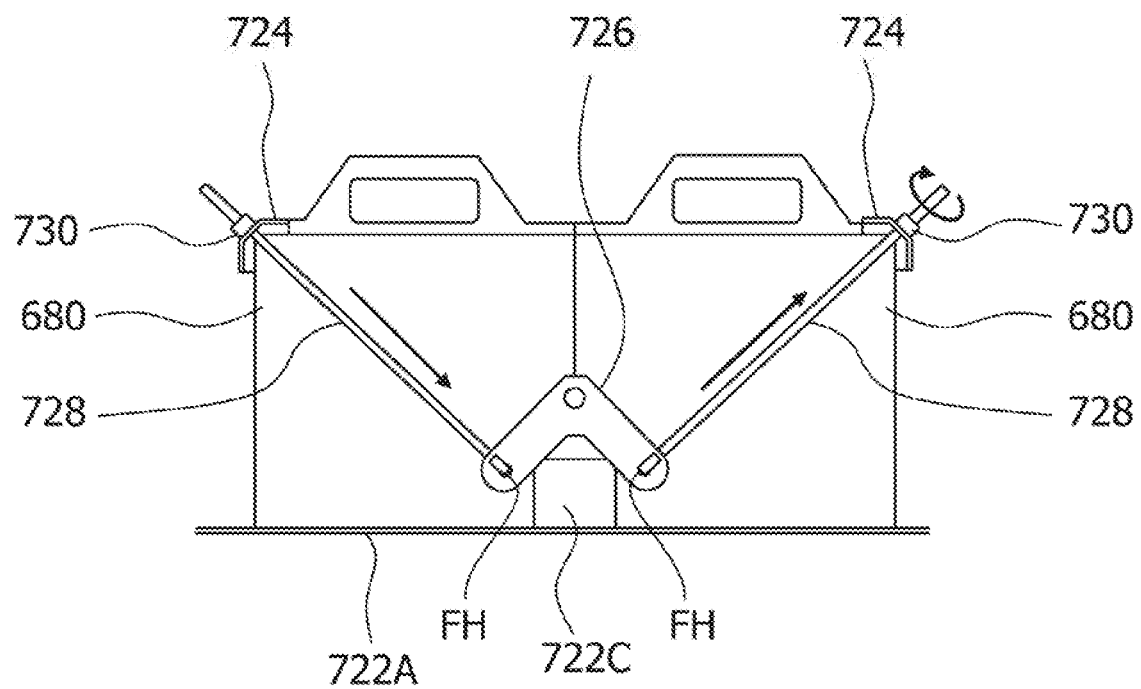
FIG. 8 is an explanatory view of the operation of the battery fixing device according to the second embodiment.

When the operator tightens the nuts 730 of the retainer 724 which retains the outer side shoulder portion of the battery 680 placed outside in the vehicle width direction, the position of the retainer 724 relative to the fixing holes FH of the V-shaped lever 726 accordingly changes, and thus, as illustrated in FIG. 8, the V-shaped lever 726 rotates according to a change in the relative position. When the V-shaped lever 726 rotates, the tensile force of the rods 728 passing through the retainer 724 which retains the outer side shoulder portion of the battery 680 placed inside in the vehicle width increases. Since the V-shaped lever 726 is symmetrical with respect to the line passing through the center of the rotation, the tensile force is substantially the same between the rods 728.

In this state, both of the lower parts of the batteries 680 located on the front and the rear of the vehicle come in contact with the battery holders BH of the lever brackets 722C, and thus, the movement of the batteries 680 in the vehicle front-rear direction is limited. The retainers 724 and the rods 728 urge both of the outer side shoulder portion of the two batteries 680 placed parallel to each other toward the fixing holes FH of the V-shaped levers 726, and thus, the movement of the batteries 680 in the vehicle width direction and in the vehicle vertical direction is limited. The batteries 680 can be fixed to the receiving member 722 simply by tightening the nuts 730 of the rods 728 passing through the retainers 724 located on the outer side in the vehicle width direction. Accordingly, the number of the nuts involved in the operation can be reduced as compared with the conventional battery fixing device, so that the operator can easily attach and detach the batteries 680. Especially, such a battery fixing device 720 allows the operator to fix the batteries mainly from the outer side in the vehicle width direction, and therefore even when the gap between the batteries 680 and the vehicle body is small, the operator can fix the batteries 680 securely.

To detach the batteries 680 from the battery fixing device 720, the operator may perform the above operation in reverse order. The above operation may be modified to some extent. For instance, the order of the steps may be changed. Similarly to the first embodiment, each side plate 722B may have a cover holder, and a battery cover bracket may be attached at the end of the bottom plate 722A on the outer side in the vehicle width direction to detachably attach a battery cover.

Figure 9:
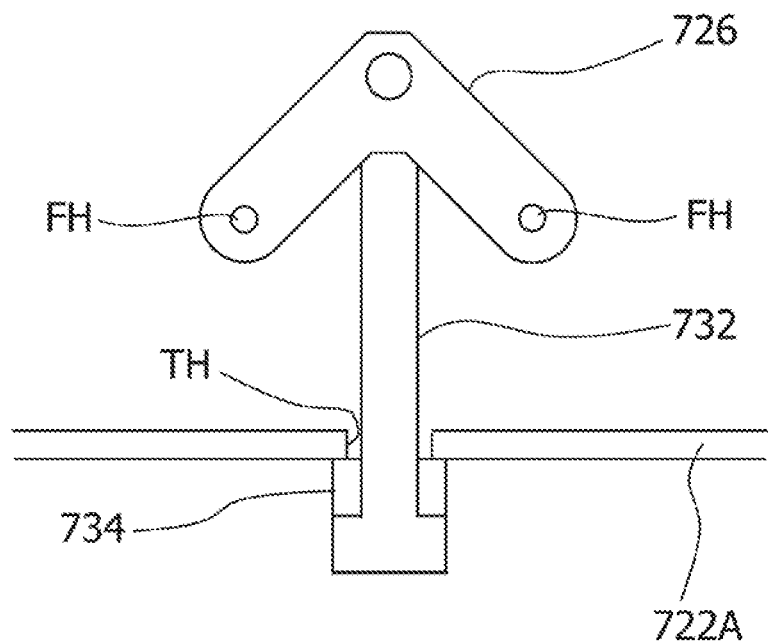
FIG. 9 is an explanatory view of a mechanism enabling vertical movement of the V-shaped lever.

The structure to rotatably support the V-shaped lever 726 is not limited to the lever bracket 722C as stated above, and the following structure may be used. As illustrated in FIG. 9, the bottom plate 722A of the receiving member 722 has a circular through hole TH at a predetermined position. Through this through hole TH, a cylindrical member 732 passes to be vertically movable, and this cylindrical member 732 has a stepped shape having a large-diameter portion at the bottom thereof and a small-diameter portion having an external thread formed at least at a lower part of the small-diameter portion. The external thread at the small-diameter portion of this cylindrical member 732 located between the large-diameter portion and the bottom plate 722A, threadably engages with a nut 734 having an internal thread on the inner circumference. A distal end of the cylindrical member 732 at the small-diameter part protrudes upward from the bottom plate 722A, and a center part of the V-shaped lever 726 is rotatably fixed to this distal end.

Figure 10:
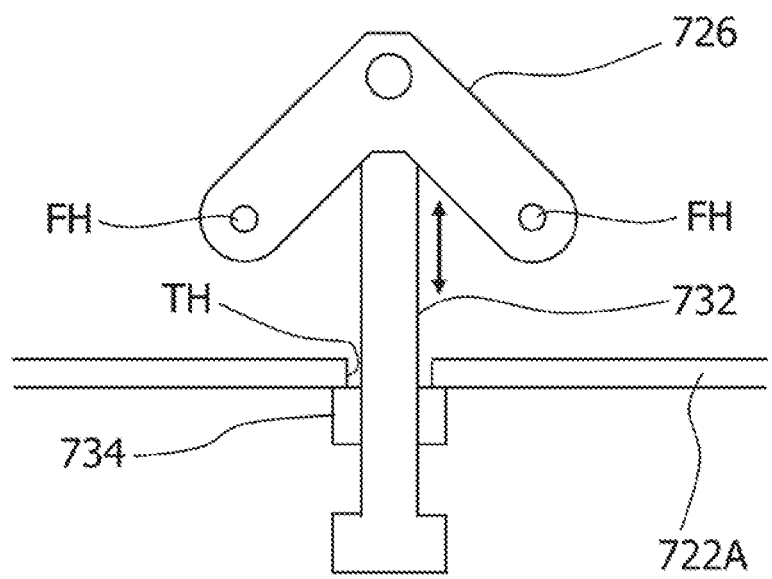
FIG. 10 is an explanatory view of the operation of the mechanism enabling vertical movement of the V-shaped lever.

When the two batteries 680 are placed on the receiving member 722 and the retainers 724 retain the outer side shoulder portions of the batteries 680, the operator rotates the nut 734, the cylindrical member 732 then moves vertically relative to the bottom plate 722A, as illustrated in FIG. 10. As the cylindrical member 732 moves vertically, the V-shaped lever 726 also moves vertically because it is rotatably fixed to the distal end of the small-diameter portion, so that the rods 728 of which their proximal ends are fixed to the fixing holes FH have a greater tensile force.

With this configuration, when the operator may appropriately set the position of the nut 730 threadably engaged with the distal end of each rod 728, it is possible to adjust the force to urge the batteries 680 against the receiving member 722 simply by rotating the nut 734 threadably engaged with the cylindrical member 732. In this configuration, since the V-shaped lever 726 is rotatably fixed to the cylindrical member 732, even if the position of the retainers 724 relative to the V-shaped lever 726 may be different to some extent, the rotation of the V-shaped lever 726 can absorb such a difference, and thus, the two batteries 680 can be fixed at the receiving member 722 with substantially equal urging force.

Figure 11:
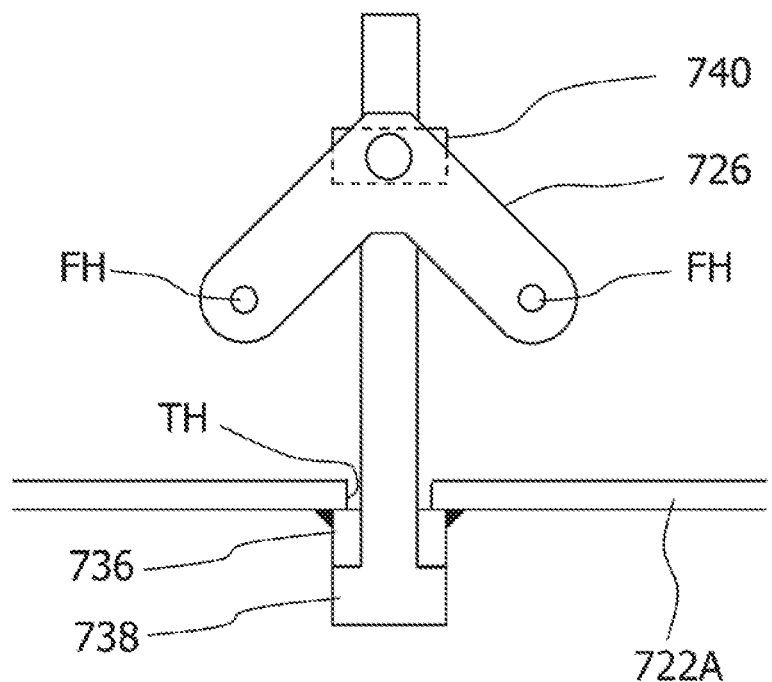
FIG. 11 is an explanatory view of another mechanism enabling vertical movement of the V-shaped lever.

To rotatably support the V-shaped lever 726, the structure as illustrated in FIG. 11 may be used. The bottom plate 722A of the receiving member 722 has a circular through hole TH at a predetermined position. A weld nut 736 is welded at the lower surface of the bottom plate 722A at a position which corresponds to the through hole TH. A bolt 738, such as a hexagon socket head cap bolt or a hexagon head bolt, is threadably engaged with the weld nut 736 from below. The bolt 738 has a shaft portion protruding upward from the bottom plate 722A, and a nut 740 having an internal thread at least on the inner circumference is threadably engaged with the shaft portion. The nut 740 has a peripheral wall, to which the center portion of the V-shaped lever 726 is rotatably fixed.

Figure 12:
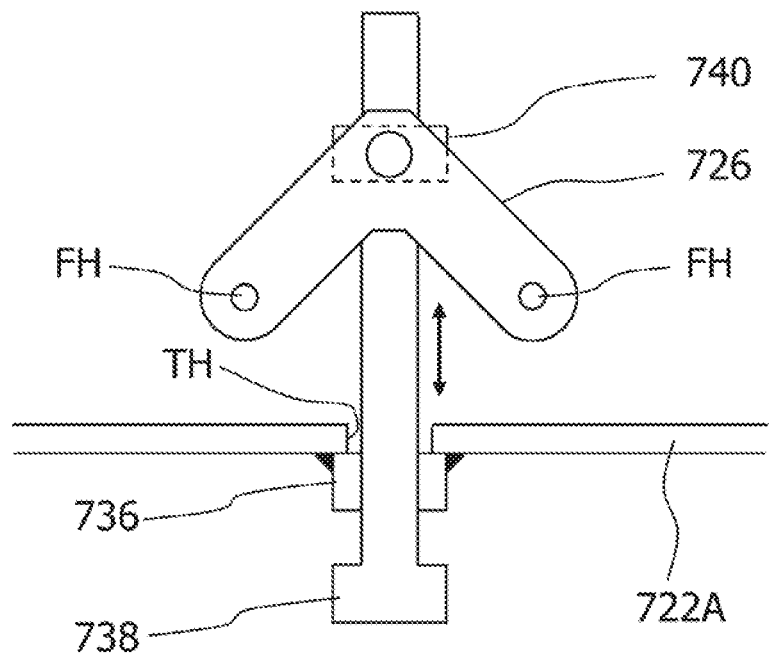
FIG. 12 is an explanatory view of the operation of another mechanism enabling vertical movement of the V-shaped lever.

When the two batteries 680 are placed on the receiving member 722, and the retainers 724 retains the outer side shoulder portions of the batteries 680, the operator rotates the bolt 738, the bolt 738 then moves vertically relative to the weld nut 736 as illustrated in FIG. 12. As the bolt 738 moves vertically, the nut 740 moves vertically relative to the receiving member 722 because the rod 728 limits the rotation of the nut 740 threadably engaged with the shaft portion. Then, the V-shaped lever 726, which is rotatably fixed to the nut 740, also moves vertically. As the V-shaped lever 726 moves vertically, the rods 728 having their proximal ends fixed to the fixing holes FH have a greater tensile force.

With this configuration, when the operator may appropriately set the position of the nut 730 threadably engaged with the distal end of each rod 728, it is possible to adjust the force to urge the batteries 680 against the receiving member 722 simply by rotating the bolt 738 threadably engaged with the weld nut 736. This configuration has similar functions and advantageous effects to those of the supporting structure of the V-shaped lever 726 illustrated in FIG. 9, and so descriptions thereof are omitted.

The lever to fix the proximal ends of the rods 728 is not limited to the V-shaped lever 726, which may be a rotating plate having other shapes, such as a rectangular, circular or elliptical shape. In this case, fixing holes FH are formed at appropriate positions of the rotating plate, to which the proximal ends of the rods 728 can be detachable fixed to be swingable.

The battery fixing device 720 may fix not only the two batteries 680, but a plurality of batteries 680. In this case, the V-shaped lever 726 may be fixed on the plane perpendicular to the direction in which the plurality of batteries 680 is disposed (the vehicle width direction) to be rotatable about the axis parallel to the plane in which the plurality of batteries 680 is placed, that is, the axis extending in the vehicle front-rear direction.

REFERENCE SYMBOL LIST

100 Truck (vehicle)
220 Side frame
560 Battery fixing device
562 Receiving member
562C Battery holder
564 Retainer
566 Rod
568 Nut
570 Battery cover bracket
680 Battery
722 Receiving member
722C Lever bracket
724 Retainer
726 V-shaped lever (rotating plate)
728 Rod
730 Nut
732 Cylindrical member
734 Nut
736 Weld nut
738 Bolt
740 Nut
SF Slanted face
FH Fixing hole

The invention claimed is:

1. A battery fixing device comprising:
a receiving member on which a plurality of batteries are placed parallel to each other, two retainers each configured to retain an outer side shoulder portion of one of the plurality of batteries;
two rotating plates that are fixed on a plane perpendicular to the direction in which the plurality of batteries is disposed to be rotatable about an axis parallel to a plane in which the plurality of batteries is placed;
four rods each having a proximal end and a distal end, the proximal ends being fixed to relatively rotate at positions on opposite sides of a rotation center of each rotating plate, and the distal ends penetrating through both ends of the retainers; and
four nuts each threadably engaged with the distal end of the rod passed through the retainer.

2. The battery fixing device according to claim 1, wherein the proximal ends of the rods are fixed at positions equally apart from the rotation center of the rotating plate.

3. The battery fixing device according to claim 1, wherein the rotating plate has an inverted V shape.

4. The battery fixing device according to claim 3, wherein the inverted V shape has an angle of 90 degrees.

5. The battery fixing device according to claim 4, wherein when the plurality of batteries are fixed with the rods, the rods extend to have an angle of 90 degrees relative to an extending part of the inverted V shape of the rotating plate.

6. The battery fixing device according to claim 1, wherein the rotating plate can be adjusted in a vertical position relative to the receiving member.

7. The battery fixing device according to claim 1, wherein each rod is a J bolt.

8. The battery fixing device according to claim 1, wherein the receiving member is attached to an outer side surface of a side frame of a vehicle.

9. The battery fixing device according to claim 1, wherein the plurality of batteries are placed parallel in the vehicle width direction.

\* \* \* \* \*